June 4, 1968     C. VAN DER LELY     3,386,235
AGRICULTURAL MACHINES

Filed Aug. 18, 1965     7 Sheets-Sheet 2

INVENTOR.
CORNELIS VAN DER LELY
BY
Mason, Mason & Albright
ATTORNEYS

INVENTOR.
CORNELIS VAN DER LELY
BY
Mason, Mason & Albright
ATTORNEYS

June 4, 1968

C. VAN DER LELY 3,386,235

AGRICULTURAL MACHINES

Filed Aug. 18, 1965

INVENTOR.
CORNELIS VAN DER LELY
BY
Mason, Mason & Albright
ATTORNEYS

June 4, 1968   C. VAN DER LELY   3,386,235
AGRICULTURAL MACHINES
Filed Aug. 18, 1965   7 Sheets-Sheet 6
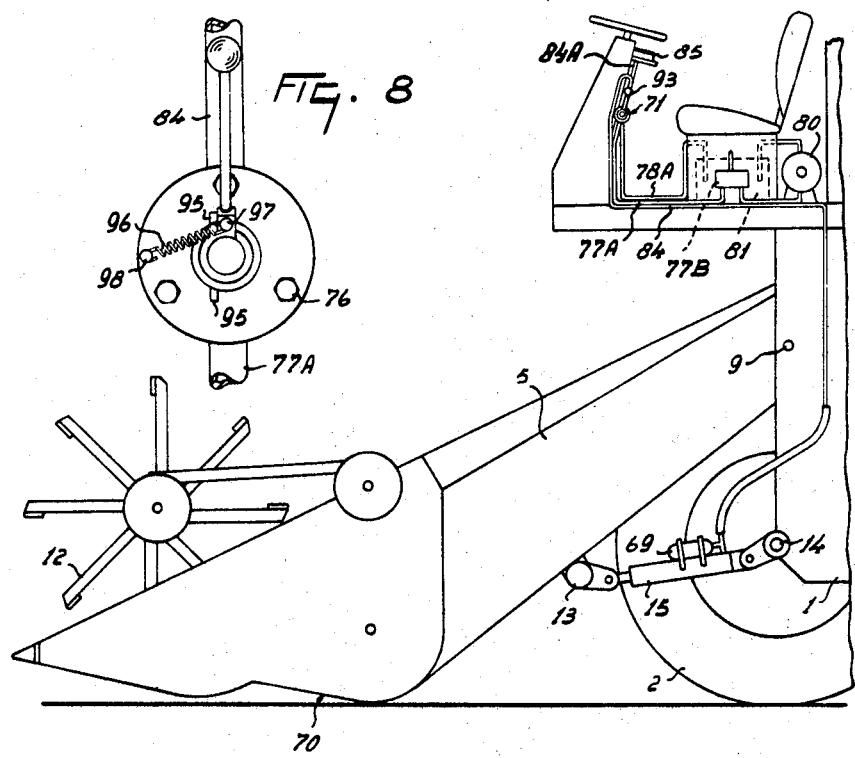
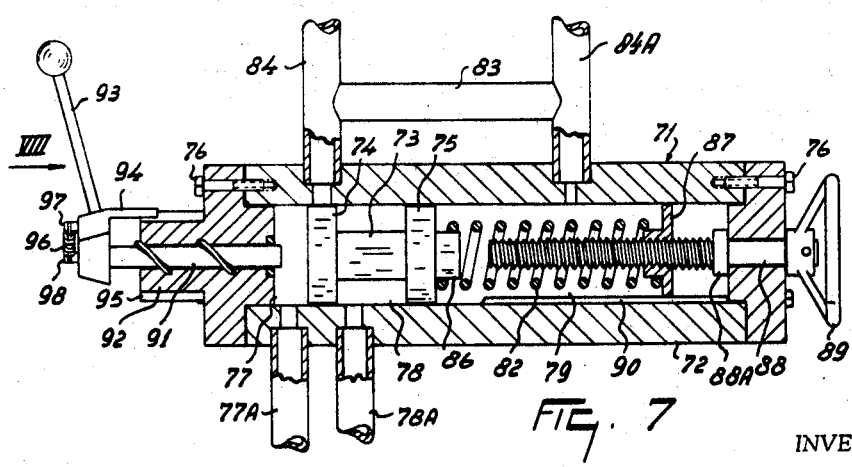
INVENTOR.
CORNELIS VAN DER LELY
BY
Mason, Mason & Albright
ATTORNEYS

INVENTOR.
CORNELIS VAN DER LELY

United States Patent Office 3,386,235
Patented June 4, 1968

3,386,235
AGRICULTURAL MACHINES
Cornelis van der Lely, Zug, Switzerland, assignor to Texas Industries Inc., a limited-liability company of the Netherlands Antilles
Filed Aug. 18, 1965, Ser. No. 480,705
Claims priority, application Netherlands, Sept. 29, 1964, 64—11,285
19 Claims. (Cl. 56—210)

ABSTRACT OF THE DISCLOSURE

A harvester having a pair of mowing and crop gathering members which bear on the ground, each of the members supported in part by hydraulic rams whereby the downward component of force of each member on the ground is maintained substantially constant, a control mechanism connected to the rams responsive to hydraulic fluid pressure changes therein causing fluid to flow on out of the rams as necessary for quick restoration to the original pressure so that the members almost instantaneously adjust to ground contours; each of the members having two such rams adapted to pivot same about different axes; the control mechanism including means to adjust the downward component of force of each member and to raise or prevent the lowering of a member; a single control mechanism controlling two of the hydraulic rams, one on each member.

SUMMARY OF THE INVENTION

This invention relates to agricultural machines, such as combine harvesters or tractors which are adapted to carry a working member arranged to bear on the ground and follow its surface undulations during operation of the machine by means of a supporting member forming part of an hydraulic circuit.

In accordance with the invention there is provided a machine of the kind set forth, wherein a control mechanism is coupled with the hydraulic circuit and is actuated during operation of the machine by variations in hydraulic pressure in the supporting member in response to corresponding movements of the working member over undulations in the ground, the arrangement being such that said variations in pressure transmitted to the control mechanism cause the control mechanism to allow liquid to flow to or from the supporting member so as to compensate for said variations and tend to maintain a substantially constant hydraulic pressure in the supporting member.

BRIEF DESCRIPTION OF DRAWINGS

For a better understanding of the invention and to show how the same may be readily carried into effect, reference will now be made, by way of example, to the accompanying drawings, in which:

FIGURE 6 is a side view of the foremost part of an alternative embodiment of combine harvester, FIGURE 7 is a sectional view, to an enlarged scale, showing the control mechanism for the combine harvester of FIGURE 6, FIGURE 8 is a view taken in the direction of the arrow VIII in FIGURE 7.

DESCRIPTION OF THE PREFERRED EMBODIMENTS

Figure 1:
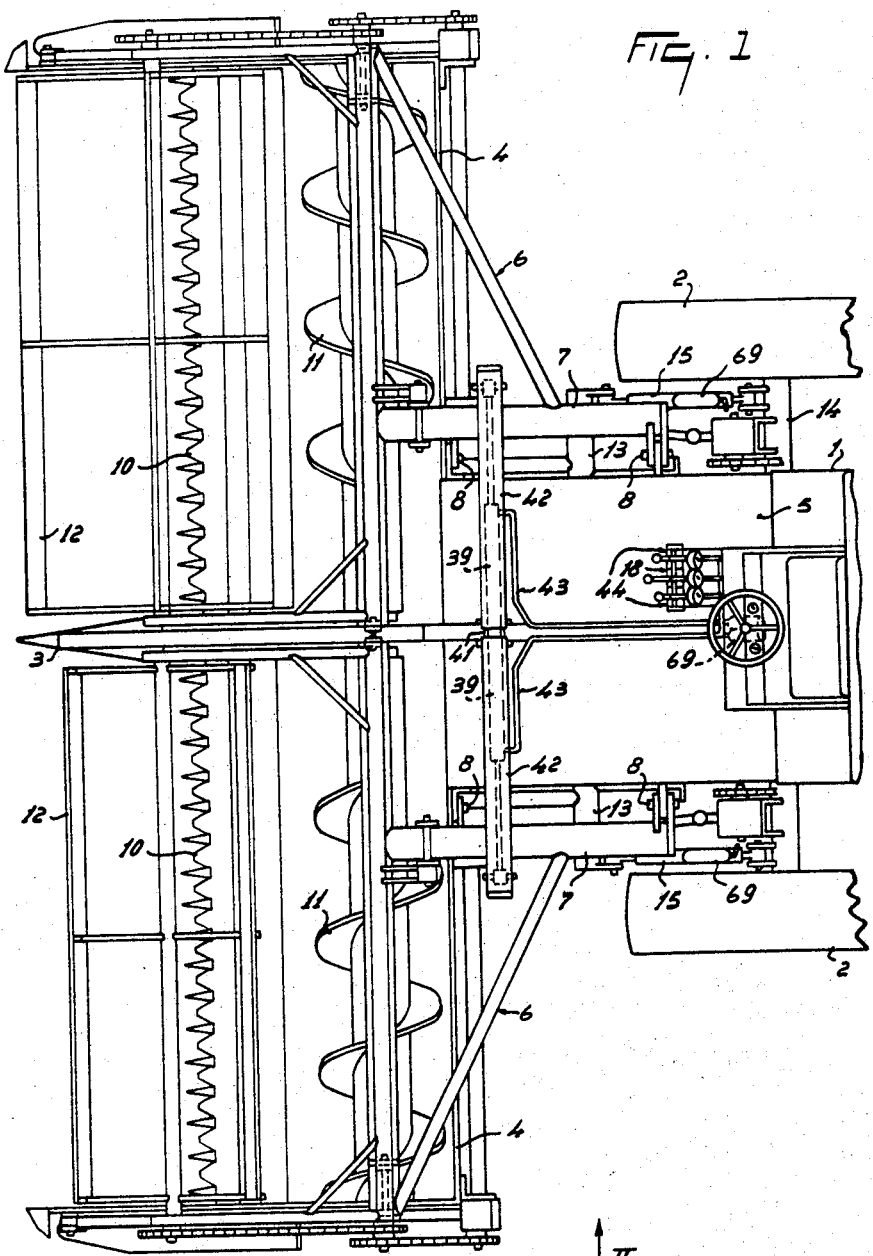
FIGURE 1 is a plan view of the foremost part of a machine in the form of a combine harvester.
Figure 2:
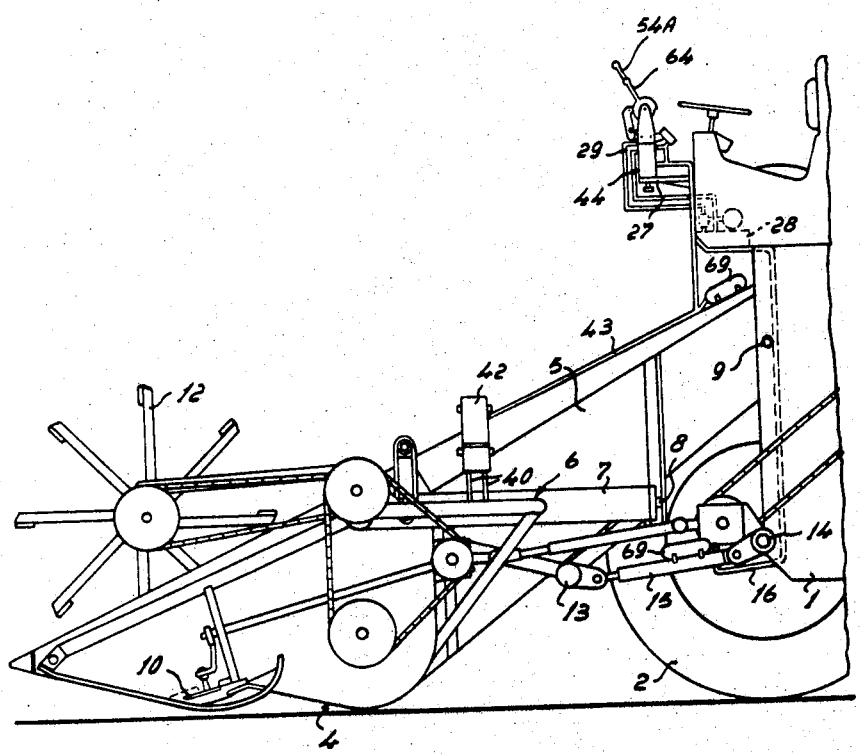
FIGURE 2 is a side view taken in the direction of the arrow II in FIGURE 1.

Referring to the combine harvester shown in FIGURES 1 to 5 and more particularly to FIGURES 1 and 2, there is shown the forward part of a combine harvester which includes a frame 1 supported by front ground wheels 2. The cutting mechanism comprises a mowing table or platform 3 which has two adjacent portions 4. The portions 4 are mounted at the forward end of an elevator housing 5 which is upwardly and downwardly movable about a shaft 9 that extends perpendicular to the intended direction of operative travel of the combine harvester. Each portion 4 has a corresponding supporting frame 6 which comprises a beam 7 extending in said direction of travel and along one side of the elevator housing 5. Each beam 7 is pivotable with respect to the housing 5 on two aligned pivot pins 8 that are secured to said one side of the housing 5. The housing 5 accommodates an endless conveyor which is rotatable about the shaft 9 which also comprises the pivotal axis of the housing 5 and portions 4.

Each portion 4 has a cutter bar 10 and a feed auger 11 located behind said cutter bar 10. Also a reel 12 is arranged above the cutter bar 10. In order to adjust the mowing table 3 and housing 5 about the axis afforded by the shaft 9, a supporting member in the form of an adjusting member or hydraulic ram 15 is provided for each portion 4. The rams 15 are pivotally connected to a supporting beam 13 that is arranged beneath the housing 5 and supports same. The beam 13 extends perpendicular to the intended direction of travel and the other ends of the rams 15 are pivotally connected to the axle 14 of the ground wheels 2.

Figure 3:
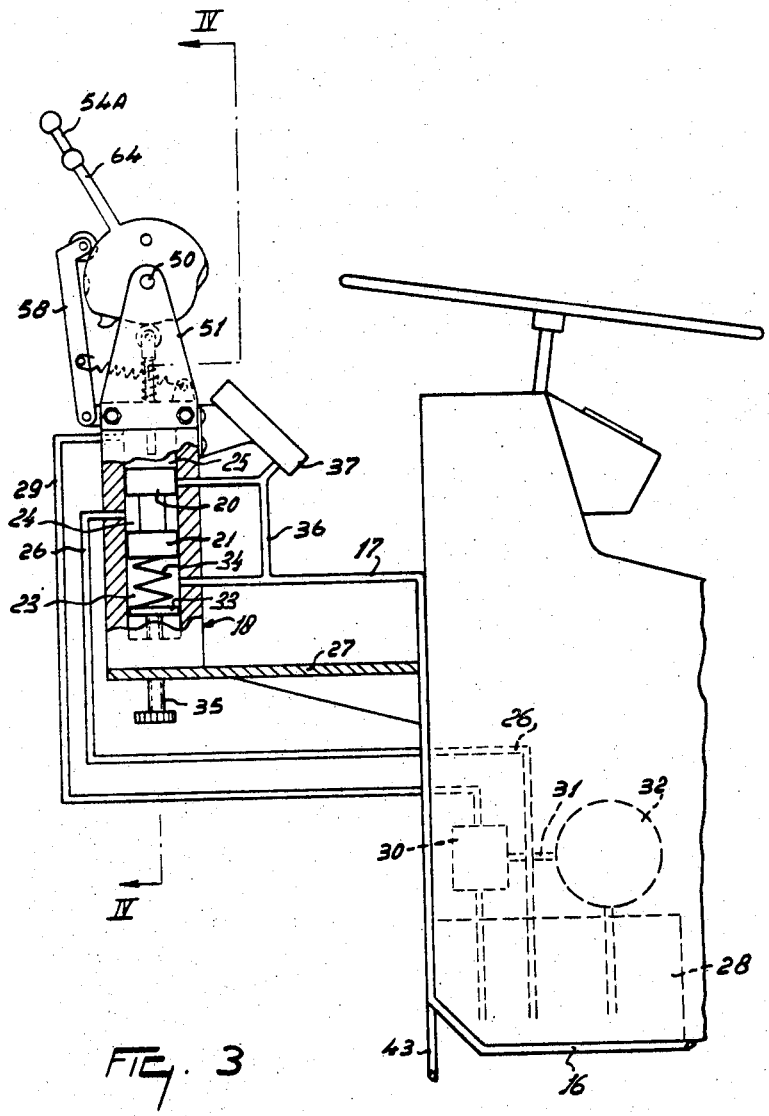
FIGURE 3 is a sectional view of control mechanisms taken on the line III—III in FIGURE 4.
Figure 4:
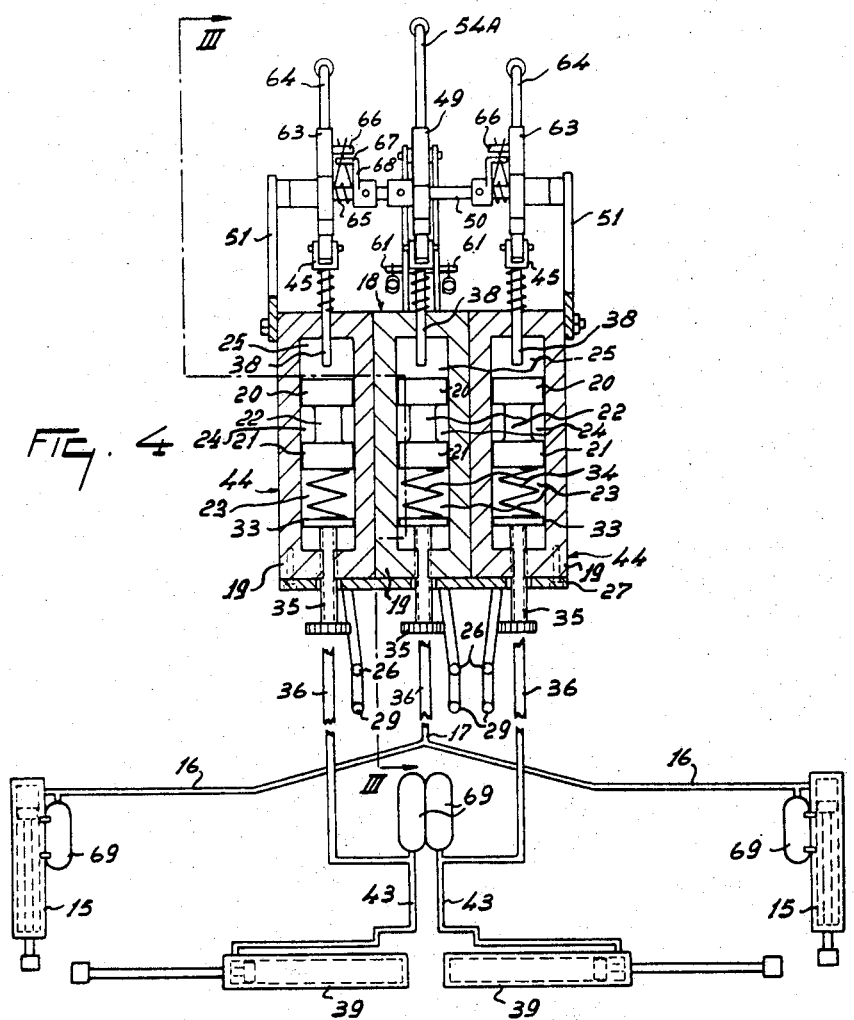
FIGURE 4 is a view, partly in section, taken on the line IV—IV in FIGURE 3, and partly a diagrammatic view, on a reduced scale, showing the hydraulic circuit and the adjusting members forming part of such circuit.

The adjusting cylinders or rams 15 form part of a hydraulic circuit for adjusting the height of the mowing table, said circuit being shown diagrammatically in FIGURES 3 and 4. FIGURE 4 shows three adjacent control mechanisms or valves 18 and 44, the mechanism 18 being located between the mechanisms 44. From FIGURES 3 and 4 it will be seen that each ram 15 communicates by way of a pipe 16 with a common pipe 17 which communicates with the housing 19 of the control mechanism 18. The housing 19 accommodates a pair of spaced pistons 20 and 21 which are slidable in directions parallel to the longitudinal axis of the housing and are interconnected by a connecting member 22. The pair of pistons 20 and 21 divides the bore in which they are slidable into three compartments 23, 24 and 25. The compartment 23 communicates with the pipe 17 (FIGURE 3) from the rams 15 and the compartment 24 communicates through a pipe 26 with a tank 28 of the hydraulic circuit. The compartment 25 communicates with a pump 32 of the hydraulic circuit through a pipe 29, a return valve 30 and a pipe 31. A spring 34 is provided in the compartment 23 and extends between the piston 21 and a stop 33 bearing on the upper end of a set bolt 35 screwed through a hole formed in a wall of the housing 19. The mechanisms 44 are similarly constructed to the mechanism 18 and like parts are designated by the same reference numerals.

From FIGURE 3 it will be seen that the common pipe 17 from the ram 15 communicates with a tapping line 36 which communicates with a pressure gauge 37 providing for measuring the pressure in the rams 15. The upper wall of the housing 19 (opposite to the one provided with the set bolts 35) receives rods 38 which extend into the compartments 25 of the mechanisms 18 and 44. The rods 38 form part of an operating mechanism for the pistons 20 and 21 which will be described later. In order to raise and lower the portions 4 of the mowing table 3 by turning same about the pivotal axes afforded by the pins 8, supporting members or rams 39 are provided which also form part of said hydraulic circuit. As seen in FIGURES 1 and 2, the rams 39 are arranged between arms 40 extending upwardly from the beams 7 and supports 41 provided on the upper side of the housing 3. The rams 39 are arranged co-axial with each other between depending limbs of channel beams 42.

As seen in FIGURE 4, each ram 39 communicates through a pipe 43 with a corresponding control mechanism 44. From FIGURES 1 and 4 it will be evident that the housings 19 of the control mechanisms 18 and 44 are joined to form a single unit which is arranged on a plate 27 mounted near the driver's seat. The housings 19 are so arranged that their longer sides extend substantially vertically and the set bolts 35 that cooperate with the springs 34 are located on the lower side of the unit. The rods 38 carry forks 45 at their upper ends and rollers 47 (FIGURE 5) are rotatably mounted between the limbs of said forks 45 by means of pivot pins 46. The rods 38 are surrounded by compression springs 48 which extend between the forks 45 and the upper sides of said unit.

Figure 5:
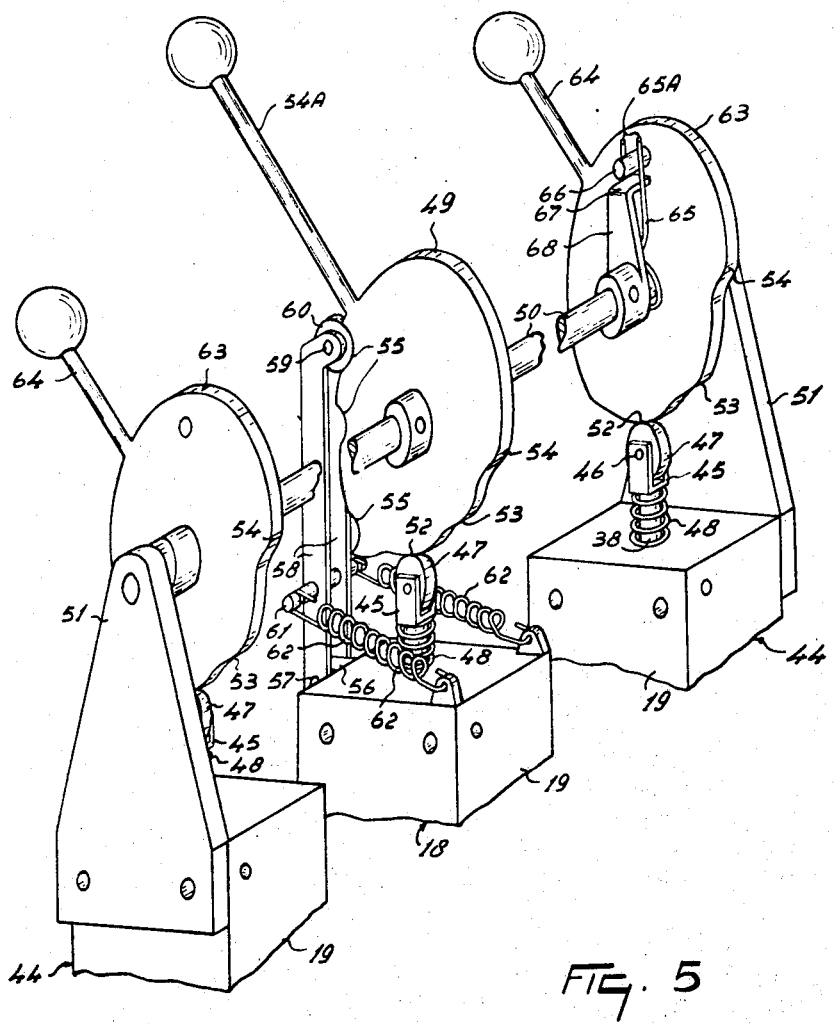
FIGURE 5 is a perspective view, to an enlarged scale, showing the adjusting members for the control mechanisms, the housings of said control mechanisms being spaced relatively far from each other for the sake of clarity.

The roller 47 associated with the control mechanism 18 is urged by its spring 48 against the periphery of a cam disc 49 that is secured to a shaft 50 rotatably mounted in a support 51 (FIGURE 5). The shaft 50 is located above the control mechanisms 18 and 44 and the supports 51 are secured to the housings of the control mechanism by means of bolts which simultaneously draw the housings 19 towards each other and into contact with each other as seen in FIGURE 4.

From FIGURE 5 it will be seen that the periphery of the disc 49 is so shaped that it has a cam that has three steps or curved projections 52, 53 and 54. It will be evident that the rod 38 of the mechanism 18 will occupy three different positions relative to the housing 19 when the roller 47 comes into contact with any one of said steps 52, 53 or 54. The disc 49 carries a lever 54A and the periphery of the disc 49 is formed with three recesses 55. The recesses 55 are adapted to receive a roller 60 rotatably mounted between two arms 58 on a pin 59. The arms 58 are pivotally connected to the housing 19 of the control mechanism 18 by means of a support 56 secured to the housing 19 and a pin 57. When the roller 60 is received in any chosen one of the recesses 55, a corresponding one of the steps 52, 53 or 54 is then in engagement with the roller 47 of the rod 38. The roller 60 is urged into engagement with the disc 49 by means of tension springs 62 which extend between the housing 19 of the control mechanism 18 and a support 61 connected to the arms 58.

The rollers 47 of the adjusting members for the pistons 20 and 21 of the adjusting mechanisms 44 cooperate with cam discs 63 which are also provided with three steps 52, 53 and 54. Each disc 63 carries a lever 64 which is located on the same side as the lever 54A of the disc 49. The discs 63 are rotatable about the shaft 50 and are coupled therewith by means of springs 65 that are attached to the shaft 50 and have their ends 65A, which cooperate with stops 66, mounted near the circumferences of the discs 63. The ends 65A are located one on each side of the corresponding stop 66. Also arranged between said ends 65A are the bent-over ends 67 of strips 68 provided on the shaft 50.

From FIGURES 1 to 4 it will be evident that each of the hydraulic rams 15 communicates with a gas pressure vessel 69 in addition to the pipes 16. The vessels 69 are fastened to the rams 15 (see FIGURE 2) and the hydraulic rams 39 are also associated with pressure vessels 69 which preferably contain nitrogen.

The hydraulic system includes means for maintaining a constant pressure in the hydraulic rams that cooperate with the working members of the machine which are, in this particular embodiment, the mowing table or parts thereof. The operation of the hydraulic system will now be described.

The working member comprising the mowing table is supported by the hydraulic rams 15 and is moved over the ground with its base bearing against the ground surface. In the position of the mowing table shown in FIGURE 2, the pistons 20 and 21 in the housing 19 of the control mechanism 18 occupy the position shown in FIGURE 3.

As mentioned previously, the rams 15 communicate with the compartment 23, and for the position of the pistons 20 and 21 shown in FIGURE 2, communication is blocked between the rams 15 and the pump 32 and tank 28 by way of the compartments 25 and 24 respectively. The piston 20 shuts the opening to the tapping line 36 and the pistons 20 and 21 are held in position shown in FIGURE 3 by virtue of the fact that the pressure in the rams 15 together with the force exerted by the spring 34 balances the pressure in the compartment 25 produced by the pump 32. When the pressure in a ram 15 varies, for example, when a portion of the mowing table encounters an obstacle, the pressure in the compartment 23 will also vary so that the pistons 20 and 21 are displaced and the opening to the tapping line 36 is uncovered by the piston 20 so that liquid can flow to or from the ram 15 concerned from or to the pump 32 or tank 28 respectively.

Upward movement of the mowing table will cause the pressure in the rams 15 to decrease which hence decreases the pressure in the compartment 23 and the pistons 20 and 21 are both displaced so that the tapping line 36 can communicate with the compartment 25 so that liquid can flow to the rams 15 from the pump 32 until equilibrium is reached whereupon the piston 20 again blocks the opening to the tapping 36 and the mowing table bears on the ground with the same pressure. When the mowing table encounters a hollow or depression in the ground, the liquid in the rams 15 will be compressed to a greater extent and the pressure in the compartment 23 will increase so that the pistons 20 and 21 are moved so as to communicate the tapping line 36 with the compartment 24 so that liquid can flow from the rams 15 to the tank 28. The pressures in the rams 15 will then be reduced to their original values and the mowing table can bear on the ground with its initial pressure.

The gas pressure vessels 69 associated with the rams 15 assist in a smooth following of the surface of the ground by the mowing table owing to the compressibility of the gas contained in such vessels 69. The vessels 69 ensure a smooth following of the ground surface in response to relatively small unevennesses in the ground surface. The pressure which the mowing table normally exerts on the ground can be varied by means of the set bolt 35 associated with the control mechanism 18. Turning of such set bolt 35 alters the compression in the spring 34. It will be evident that, if the compression in the spring 34 is increased, then a relatively lower hydraulic pressure in the compartment 23 and rams 15 will be required in order to balance the forces exerted by the pressure of the hydraulic liquid in the compartment 25 that is in communication with the pump 32. With a lower hydraulic pressure in the rams 15, the mowing table will bear on the ground with a greater pressure and, conversely, reducing the compression in the spring 34 will cause the mowing table to bear on the ground with relatively lower pressure. The pressure prevailing in the rams 15 may be ascertained by viewing the pressure gauge 37.

The set bolt 35 associated with the control mechanism 18 used in conjunction with the pressure gauge 37 allows the pressure in the rams 15 and hence the pressure which the mowing table exerts on the ground to be set to any desired value prior to commencing operation of the combine harvester. Once chosen, this pressure will be automatically maintained. The operation of the control mechanisms 44 for the hydraulic rams 39 corresponds with the operation of the control mechanism 18 just described. The control mechanisms 44 for the rams 39 enable a satisfactory adaptation of the outside edges of the mowing table portions 4 to the ground surface. The portions 4 which each comprise a working member are pivotable relative to the frame of the combine harvester about pivotal axes afforded by the pins 8. Also the vessels 69 associated with the portions 4 afford a resiliency to the support thereof by the rams 39.

As stated previously, the rods 38 which are slidably arranged in the housing 19 of the control mechanisms 18 and 44 can be moved into three different positions by means of the cam disc 49 for the control mechanism 18 and the cam discs 63 for the control mechanisms 44. In the positions of the discs shown in FIGURE 5, the rods 38 occupy the positions shown in FIGURE 4 and the rollers 47 bear against the steps 52 on the peripheries of the discs. The disc 49 may be rotated by means of the lever 54A and the discs 63 then will also be rotated by the same amount until the rollers 47 come into contact with the steps 53. The rods 38 then abut against the pistons 20 to prevent the compartments 24 from communicating with the rams 15 and 39 respectively as would normally be the case when said pistons are moved by variations in pressure in the rams. This position of the rod 38 can be varied when in operation the mowing table is held at a distance above the ground. Out of this position in which the rollers 47 bear against the steps 53, the resilient connection of the discs 63 with the shaft 50 permits them to moved independently of each other and the disc 49, by means of the levers 64 into positions in which their rollers 47 come into contact with the steps 54.

As a result of the movement of the discs 63 so that the rollers 47 come into contact with the steps 54, the rods 38 in the housing 19 of the control mechanisms 44 are displaced so that the pistons 20 no longer prevent a supply of liquid from the pump 32 to the rams 39. Hence the portions 4 of the mowing table can be pivoted upwardly about their pivots 8. Hence, during operation, each portion 4 can be independently pivoted, if desired, about its pivotal axis afforded by the pins 8. The rigidity of the springs 65 is such that, when a disc 63 is displaced, the disc 49 is not unlocked from the engagement of the roller 60 with the chosen recess 55. The mowing table as a whole can be raised by moving the lever 54A until the disc 49 takes up such a position that the roller 47 comes into contact with the step 54. The disc 49 is held in this position by the roller 60 and the pistons 20 and 21 are then located in a position such that liquid can flow from the pump 32 to the rams 15.

It will be evident from FIGURE 5 that the step 54 on the disc 49 is offset relative to the steps 54 on the discs 63 so that said first-mentioned step 54 comes into contact with the roller 47 of the control mechanism 18 for the rams 15 earlier than the steps 54 of the discs 63 come into contact with the rollers 47 of the control mechanisms 44. Hence the mowing table will be raised partly before the steps 54 on the discs 63 come into contact with the rollers 47 of the control mechanisms 44 thereby pivoting the portions of the mowing table inwardly about the pivots 8 by the rams 39.

Referring now to FIGURES 6 to 8, there is shown an alternative embodiment of combine harvester which has a mowing table 70 that comprises a single working member. In this embodiment the rams 15 and pressure vessels 69 associated therewith are arranged in the same manner as for the preceding embodiment. The hydraulic circuit including the hydraulic rams is provided with a control mechanism 71 which operates in similar manner to the control mechanisms 18 and 44 described with reference to the preceding embodiment. However, the construction of the control mechanism 71 differs from that of said mechanisms 18 and 44 and will be described more fully with reference to FIGURE 7.

As in the previous control mechanism, the control mechanism 71 has an elongated housing 72 which accommodates two pistons 74 and 75 which are interconnected by a connecting member 73 and said pistons are movable in directions parallel to the longitudinal axis of the housing 72. The end walls of the housing 72 are connected to the main body of the housing 72 by means of bolts 76. The pistons 74 and 75 divide the interior of the housing 72 into three compartments 77, 78 and 79 and the compartment 77 communicates through a pipe 77A and a backing valve 77B with a pump 80 and the compartment 78 communicates through a pipe 78A with a tank 81. The compartment 79 houses a compression spring 82 and communicates through a tapping line 83 with a pipe 84 which leads to the hydraulic rams 15. The pipe 84 also communicates with the housing 72 and, as in the preceding embodiment, communicates through a pipe 84 with a pressure gauge 85.

The compression spring 82 is arranged at one end around a boss 86 provided on the piston 75 and at the other end bears against a stop 87. The stop 87 is formed with a tapped hole that receives a screw-threaded rod 88 which is taken through a hole formed in an end wall of the housing 72. The rod 88 is prevented from axial movement relative to the housing 72 by means of an adjusting wheel 89 provided on the outer projecting end of the rod 88 and a ring 88A mounted inside the housing 72 and abutting against an end wall thereof. The stop 87 is prevented from turning by a guide 90 provided inside the housing 72. The compression in the spring 82 can be varied by turning the wheel 89.

As in the control mechanisms 18 and 44 of the preceding embodiment, the adjusting member for displacing the pistons 74 and 75 includes a rod 91 projecting into the housing 72 and formed with a screwthread. The threaded rod 91 is received in a tapped hole formed in a boss 92 projecting from an end wall of the housing 72. The portion of the rod 91 that projects outwardly beyond the housing 72 is coupled with a spring-loaded control lever 93 which can occupy two different positions (see FIGURE 8).

In either of said two positions of the lever 93, a stop 94 carried by the lever 93 engages with either of two stops 95 provided on the housing 92. The spring loading of the lever 93 is afforded by a tension spring 96 which is arranged between a pin 97 carried by the lever 93 and a pin 98 provided on the housing 72. Turning of the lever 93 in one direction causes the rod 91 to be axially displaced towards the piston 74 and urges same so as to uncover the opening to the pipe 84 which allows high pressure liquid to flow from the pump 80 through the pipe 77A and compartment 77 to the hydraulic rams 15 thereby raising the mowing table. When the mowing table is raised on operation of the control lever 93, it will continue to hold its raised position for as long as the piston 74 is held out of engagement with the opening to the pipe 84 by the rod 91. Turning of the lever 93 in the opposite direction withdraws the rod 91 and the hydraulic pressure in the ram 15 caused by their support of the mowing table off the ground is exerted in the compartment 79 against the face of the piston 75 which then moves so that the pipes 84 and 78A can communicate with each other by way of the compartment 78 and hence liquid flows from the rams 15 to the tank 81 thus lowering the mowing table. The oscillations performed by the mowing table in following the surface of the ground during operation of the combine harvester are transmitted from the rams 15 to the control mechanism 71 which compensates for these undulations in similar manner to that of the preceding embodiment.

Figure 9:
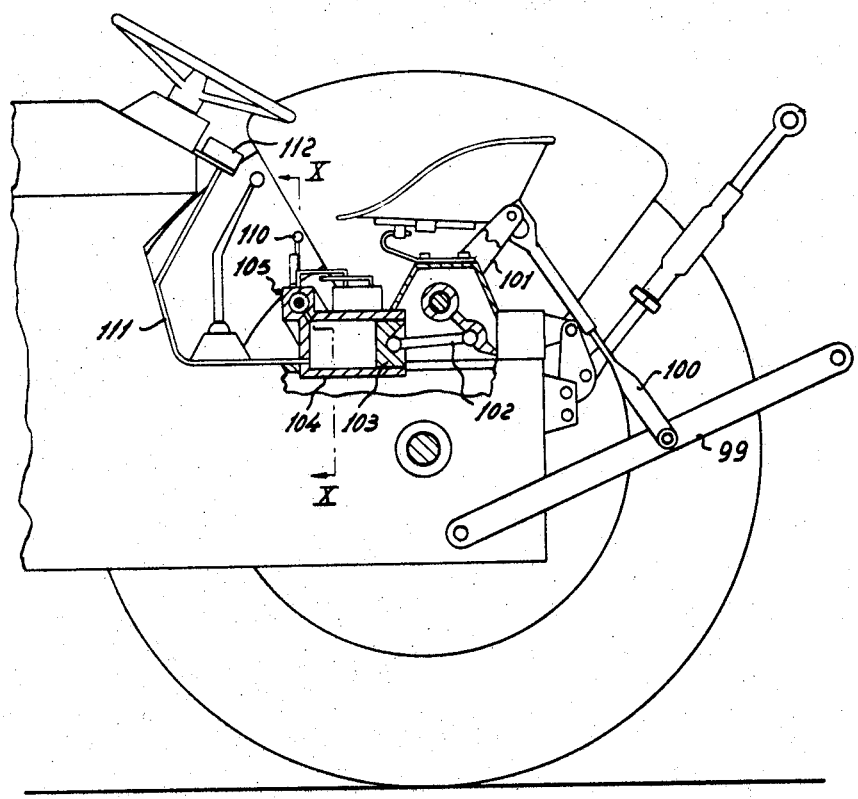
FIGURE 9 shows part of a further machine in accordance with the invention comprising a tractor.
Figure 10:
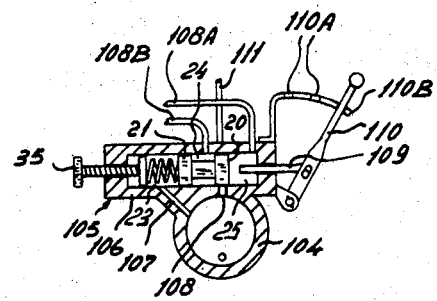
FIGURE 10 is a sectional view, to an enlarged scale, taken on the line X—X in FIGURE 9.

Referring to FIGURES 9 and 10, there is shown part of a tractor, the rear part thereof being shown in FIGURE 9 and part of FIGURE 9 being shown in FIGURE 10. The tractor is provided with a three-point hitch, whose lower links 99 are each coupled through a corresponding bar 100 with an angle lever 101. The other end of the angle lever 101 cooperates with a rod 102 which is coupled with a piston 103 reciprocable in an adjusting cylinder 104 which forms part of the hydraulic circuit of the tractor. The cylinder 104 is associated with a control mechanism 105 whose construction and operation is substantially similar to that of the control mechanisms 18 and 44 described with reference to FIGURES 1 to 4. Corresponding parts are designated by the same reference numerals.

The housing 106 of the control mechanism 105 is integral with the cylinder 104, the cylinder 104 communicating with the compartment 23 through a duct 107 and with the compartment 24 or 25 through a duct 108. The compartment 25 communicates with a hydraulic pump through a pipe 108A and the compartment 24 communicates with the hydraulic tank through a pipe 108B. The control mechanism 105 includes a rod 109 that is associated with the adjusting member for the pistons 20 and 21. The rod 109 is movable between three positions by means of a lever 110 which is displaceable along a guide 110B and can be inserted in any one of three recesses 110A formed in the guide 110B. In the position of the lever 110 shown in FIGURE 10 a constant pressure is maintained in the cylinder 104. It will be evident that working members can be coupled with the three-point hitch of the tractor.

When the pressure in the cylinder 104 is relatively constant it will be evident that said working members will bear on the ground surface with a relatively constant pressure also. When the lever 110 is turned in a counter-clockwise direction as seen in FIGURE 10 and inserted in the second recess 110A, the piston 20 is prevented from being displaced to the right as seen in FIGURE 10 which prevents the morking members from being lowered since the pipe 108B leading to the tank and the duct 108 leading to the cylinder 104 cannot communicate with each other. Further turning of the lever 110 urges the piston 20 to the left as seen in FIGURE 10 and the pump can then communicate with the cylinder 104 thus causing the working members to be raised. When the lever 110 is in the position shown in FIGURE 10 and when working members are being drawn behind the tractor, oscillations performed by the working members in the following the surface of the ground are transmitted to the cylinder 104 which will cause corresponding variations in pressure in the compartment 23 which in turn will cause the piston 21 to move within the housing 106. Such movement of the piston 21 and associated movement of the piston 20 will allow liquid to flow to or from the cylinder 104 from or to the pump or tank respectively. In this way the working members can smoothly follow the surface of the ground during operation. A pressure gauge 112 is connected to the adjusting cylinder 104 by way of a pipe 111 and may be observed in order to determine the pressure in the cylinder 104. It will be evident that this pressure in the cylinder 104 will control the pressure with which the working members bear upon the ground surface. A set bolt 35 is provided for controlling the compression in the spring disposed in the compartment 23 and it will be evident that the normal pressure with which the working members bear on the ground will be dependent on the compression in the spring.

Also the machines described, the two embodiments of combine harvester and the tractor, enable their working members to bear upon the ground surface with any chosen given pressure and to follow the surface of the ground during operation. The provision of the pressure gauges enables the pressure in the hydraulic circuits to be readily determined and any adjustments may be made as a consequence of such observation.

It will be evident that the hydraulic rams utilized in the two combine harvesters comprise supporting members for the working members, that is, the mowing table.

Having thus described my invention, what I claim as new and desire to secure by Letters Patent of the United States is:

1. A machine having a frame, an implement connected to said frame and bearing on the ground, supporting members for said implement and a hydraulic circuit communicating with said supporting members for actuating said implement, a control mechanism in said circuit responsive to variations in pressure caused by the contact of said implement with ground undulations, means in said circuit for allowing fluid to flow to and from said supporting members to compensate for said variations and to maintain a substantially constant hydraulic pressure in said circuit and said supporting members, said implement including two working members which are each coupled to a hydraulic ram supporting member in a second hydraulic circuit to pivot said working members relative to each other and wherein further control mechanisms are provided for allowing fluid to flow to and from said rams to compensate for variations in hydraulic pressure caused by the contact of said implement with ground undulations.

2. A machine as claimed in claim 1, wherein each control mechanism communicates with a corresponding supporting member and with a tank and pump forming part of its corresponding hydraulic circuit.

3. A machine as claimed in claim 1, wherein each control mechanism comprises a housing, a first piston reciprocable in said housing, and a second reciprocable piston connected to said first piston, said second piston being spring biassed and being arranged to be subjected to the hydraulic pressure prevailing in its corresponding supporting member and to be urged thereby in the same direction as said biassing.

4. A machine as claimed in claim 3, wherein said first and second pistons are spaced from each other and said first piston defines a first compartment within the housing which communicates with said pump and a second compartment which communicates with said tank.

5. A machine as claimed in claim 4, wherein in each control mechanism, displacement of the first piston allows either of said compartments to communicate with its corresponding supporting member.

6. A machine as claimed in claim 5, wherein a spring engages said second piston to effect said spring biassing and said spring is arranged within a third compartment of the housing, said third compartment being in communication with its corresponding supporting member.

7. A machine as claimed in claim 6, wherein means is provided for varying the force exerted by said spring on said second piston.

8. A machine as claimed in claim 3, wherein each control mechanism is provided with a corresponding adjusting member for displacing said pistons against the action of said spring biassing so that a compartment that communicates with the pump is allowed to communicate with its corresponding supporting member.

9. A machine as claimed in claim 8, wherein said adjusting member includes a rod that is displaceable in a direction parallel to the longitudinal axis of the housing.

10. A machine as claimed in claim 9, wherein said rod is movable between three positions, the rod being completely out of contact with said first piston in one of said positions and just in contact with said first piston in a second of said positions so that movement of said first piston in one direction is prevented.

11. A machine as claimed in claim 10, wherein said rod is displaceable by being turned about on its own axis.

12. A machine as claimed in claim 11, wherein one end of the rod is provided with a spring loaded lever which is movable between a plurality of angular settings about the axis of said rod for adjusting same.

13. A machine as claimed in claim 12, wherein the free end of the rod is urged into contact with a turnable cam disc by a spring, said disc being fixable in a plurality of angular settings about its axis by means of a locking member.

14. A machine as claimed in claim 13, wherein said end that cooperates with the disc carries a roller which engages the periphery of the disc.

15. A machine as claimed in claim 1, wherein each supporting member is coupled with a gas pressure vessel for resiliently supporting its corresponding working member.

16. A machine as claimed in claim 1, wherein the machine is a combine harvester and the implement comprises a mowing table.

17. A machine as claimed in claim 16, wherein each control mechanism is located in the proximity of the driver's seat of the harvester.

18. A machine as claimed in claim 16, wherein the mowing table comprises two portions which are turnable relative to each other about axes that lie in planes extending parallel to the intended direction of operative travel of the machine.

19. A machine as claimed in claim 18, wherein each mowing platform portion includes its own cutting mechanism.

References Cited

UNITED STATES PATENTS

| | | | |
|---|---|---|---|
| 2,224,970 | 12/1940 | Lindgren et al. | 56—20 |
| 3,066,465 | 12/1962 | Fischer | 56—25 |
| 3,088,264 | 5/1963 | Sallee | 56—210 |
| 3,137,984 | 6/1964 | Shonkwiler | 56—214 |
| 3,312,048 | 4/1967 | Ammat et al. | 56—214 |

FOREIGN PATENTS 1,225,520  2/1960  France.

ABRAHAM G. STONE, *Primary Examiner.*

P. A. RAZZANO, *Assistant Examiner.*